United States Patent [19]

Nakagawa

[11] 4,258,107
[45] Mar. 24, 1981

[54] STORAGE BATTERY WITH VENT AND FILLING CONTROL MEANS IN COVER

[75] Inventor: Yoshichika Nakagawa, Takatsuki, Japan

[73] Assignee: Yuasa Battery Company Limited, Takatsuki, Japan

[21] Appl. No.: 83,272

[22] Filed: Oct. 10, 1979

[30] Foreign Application Priority Data

Oct. 19, 1978 [JP] Japan .............................. 53/129148
Jun. 29, 1979 [JP] Japan ........................... 54/90503[U]

[51] Int. Cl.³ .............................................. H01M 2/36
[52] U.S. Cl. ....................................... 429/78; 429/88
[58] Field of Search ..................... 429/63, 73, 78, 88, 429/77, 74, 87

[56] References Cited

U.S. PATENT DOCUMENTS

| 3,708,348 | 1/1978 | Painter | 429/78 |
| 3,772,088 | 11/1973 | Hennen | 429/88 |
| 4,087,592 | 5/1978 | Okazaki | 429/78 |
| 4,117,205 | 9/1978 | Kitai | 429/88 |

FOREIGN PATENT DOCUMENTS

| 2303244 | 1/1973 | Fed. Rep. of Germany | 429/74 |
| 144931 | 8/1976 | United Kingdom | 429/73 |

Primary Examiner—Donald L. Walton
Attorney, Agent, or Firm—Watson, Cole, Grindle & Watson

[57] ABSTRACT

The invention involves storage batteries and, more particularly a storage battery wherein a battery container cover has a specially improved structure. This is a storage battery wherein a hollow electrolyte filled part common to respective cells is made in a cover, venting and electrolyte pouring holes, electrolyte level defining tubes projected at the upper ends from the bottom of the electrolyte filled part and suspended at the lower ends substantially down to a defined electrolyte level and dividing walls dividing the electrolyte filled part into cell units and lower than the upper ends of the above mentioned electrolyte level defining tubes are provided as adapted to respective cells in the bottom of the electrolyte filled part, an exhaust port common to the respective cells is provided at one end of the electrolyte filled part, an electrolyte pouring port common to the respective cells is provided in the upper part of the electrolyte filled part and a holeless electrolyte port plug closing the above mentioned electrolyte pouring port is provided. Thus, in this storage battery, the electrolyte pouring operation can be easily made, a proper amount of the electrolyte can be poured in, further the amount of the electrolyte flowing back to the electrolyte filled part during the use can be returned to the original cell, the electrolyte can be prevented from leaking out and the generated gas can be favorably exhausted.

6 Claims, 8 Drawing Figures

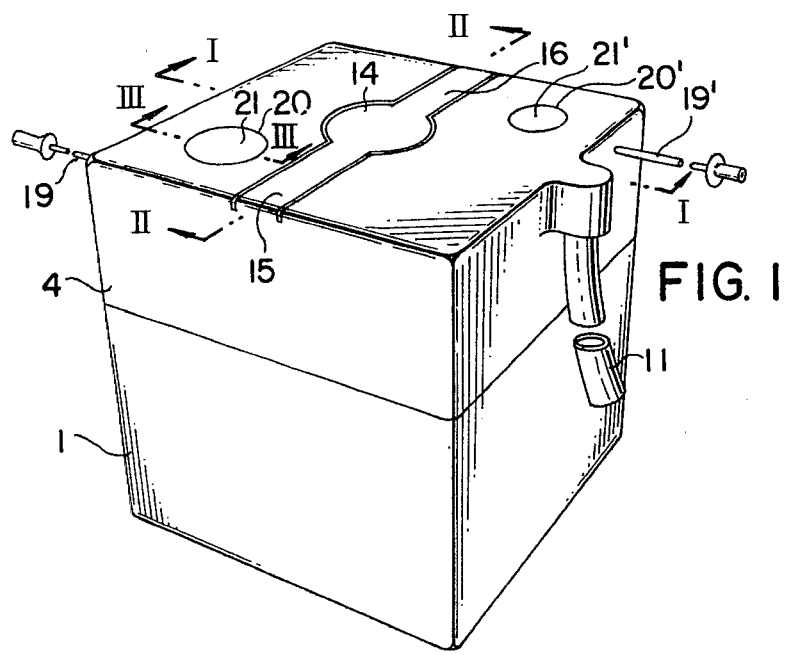
FIG. 1
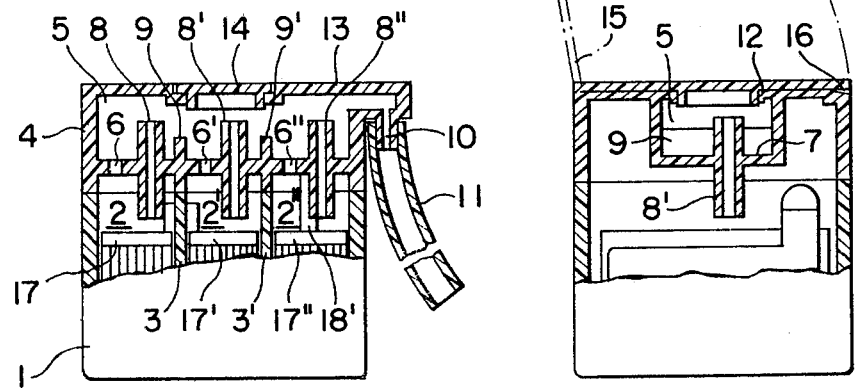
FIG. 2
FIG. 3

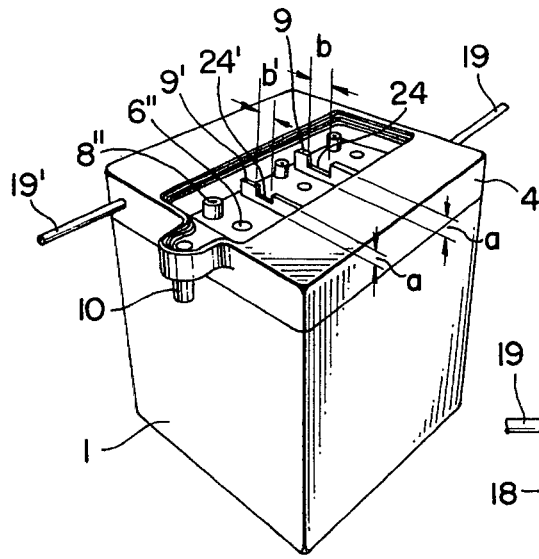
FIG. 8
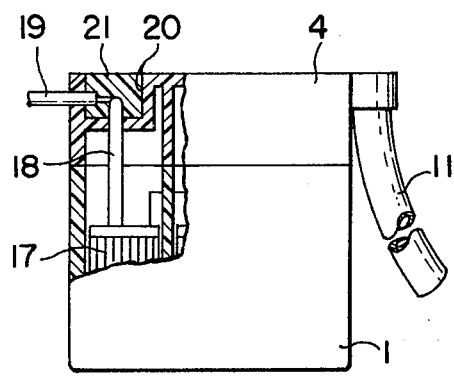
FIG. 4
FIG. 5   FIG. 6   FIG. 7
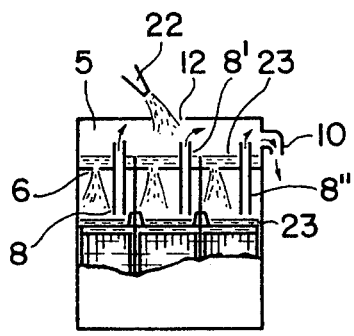
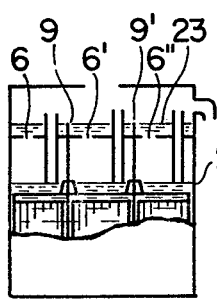

STORAGE BATTERY WITH VENT AND FILLING CONTROL MEANS IN COVER

BACKGROUND OF THE INVENTION:

1. Field of the Invention:

This invention relates to storage batteries and more particularly to improvements of the electrolyte filled part.

2. Description of the Prior Art:

There have been already suggested various storage batteries wherein an electrolyte filled part common to respective cells is filled en masse with an electrolyte so that respective cells may be automatically filled with the electrolyte to a defined electrolyte level. In a typical structure, an electrolyte filled pool common to respective cells is provided in a cover and is provided with air venting and electrolyte pouring holes and electrolyte pouring tubes suspended at the lower ends down to a predetermined electrolyte level for the respective cells. According to this structure, when the electrolyte with which the above mentioned pool is filled flows into the respective cells through the above mentioned venting and electrolyte filling holes and then reaches the lower ends of the electrolyte pouring tubes, the gas within the cells will be no longer able to escape out, the electrolyte will stop flowing in and the defined electrolyte level will be automatically obtained. In such case, when the battery is lightly rocked, the electrolyte staying within the electrolyte filled pool in the ending period of pouring the electrolyte will be able to be made to flow down into the cells. However, in this structure, as the bottom of the electrolyte filled pool is common to the respective cells, when the electrolyte staying in the pool is made to flow down as mentioned above, there will be no guarantee that the electrolyte will be distributed uniformly in the respective cells and the electrolyte flowing back into the pool due to the vibration during the use will not be always returned in the same amounts into the original cells. Therefore, there has been a defect that the amounts of the electrolyte in the respective cells are likely to be unbalanced.

SUMMARY OF THE INVENTION

The storage battery of the present invention is of a structure in which the above mentioned defect is eliminated.

A first object of the present invention is to provide a storage battery wherein the electrolyte pouring operation is easy and all the cells can be filled with the electrolyte positively to a defined electrolyte level.

A second object of the present invention is to provide a storage battery wherein the electrolyte flowing back from respective cells during the use can be returned to the original cells and the amounts of the electrolyte in the respective cell can be kept uniform.

A third object of the present invention is to provide a storage battery wherein the above mentioned electrolyte flowing back can be well prevented from leaking out through an exhaust port for exhausting the generated gas.

BRIEF DESCRIPTION OF THE DRAWINGS

The present invention can be easily understood from the explanation on the following drawings:

FIG. 1 is a perspective view of a storage battery of the present invention;

FIG. 2 is an elevation sectioned in an essential part of the storage battery as vertically sectioned on line I—I in FIG. 1; FIG. 3 is a side view sectioned in an essential part of the storage battery as vertically sectioned on line II—II in FIG. 1;

FIG. 4 is an elevation sectioned in an essential part of the storage battery as vertically sectioned on line III—III in FIG. 1;

FIG. 5 is a sectioned view schematically showing the state in the initial period of pouring the electrolyte;

FIG. 6 is a sectioned view schematically showing the state in the ending period of pouring the electrolyte;

FIG. 7 is a sectioned view schematically showing the state after the electrolyte remaining in the electrolyte filled part as in FIG. 6 is made to flow down into the respective cells by shaking the battery container after the pouring of the electrolyte is completed;

FIG. 8 is a perspective view of a battery with a part of the cover removed showing another embodiment of the present invention.

DETAILED DESCRIPTION OF PREFERRED EMBODIMENTS

In the drawings, 1 is a battery container molded of such thermoplastic synthetic resin as, for example, a polyolefine type synthetic resin, 2, 2' and 2" are cells sectioned and formed respectively of partitions 3 and 3', 4 is a cover molded of the same material as of the battery container 1 and bonded to cover the battery container by thermofusing, 5 is a hollow electrolyte filled part formed in the cover 4 and common to the respective cells, 6, 6' and 6" are venting and electrolyte pouring holes provided in the bottom 7 of the electrolyte filled part 5, 8, 8' and 8" are electrolyte level defining tubes projected at the upper ends from the bottom 7 into the electrolyte filled part 5 and suspended at the lower end substantially down to the defined electrolyte levels of the cells 2, 2' and 2" and 9 and 9' are dividing walls dividing the electrolyte filled part 5 into the cell units and lower than the upper ends of the electrolyte level defining tubes 8, 8' and 8". 10 is an exhaust port provided at one end of the electrolyte filled part 5 and common to the respective cells. 11 is an exhaust pipe made of a soft synthetic resin and fitted to the exhaust port 10. 12 is an electrolyte pouring port provided in the upper part 13 of the electrolyte filled part 5 and common to the respective cells. 14 is a holeless hinged electrolyte port plug closing the electrolyte pouring port 12. 15 is a hinge made to operate rotatably at one end of the cover 4 with which the hinged electrolyte port plug 14 is integrally connected. 16 is a grip of the hinged electrolyte port plug 14. 17, 17' and 17" are plate groups contained respectively in the cells 2, 2' and 2". 18 and 18' are terminal posts. 19 and 19' are lead wires connected respectively to the terminal posts 18 and 18'. 20 and 20' are terminal recesses provided in the cover 4. 21 and 21' are sealing bodies made of the same material as of the cover and injection-molded respectively in the terminal recesses 20 and 20'. 22 is such electrolyte pouring tool as a syringe. 23 is an electrolyte.

The storage battery according to the present invention is formed as illustrated and the electrolyte is poured into it in the following manner.

First of all, as shown by the chain lines in FIG. 3, the grip 16 is gripped and the electrolyte port plug 14 is rotated upward to open the electrolyte pouring port 12. Then, as shown in FIG. 5, when the electrolyte 23 is poured en masse into the electrolyte filled part 5 through the electrolyte pouring port 12 by using the electrolyte pouring tool 22, the electrolyte will flow mostly into the middle electrolyte filled part enclosed with the dividing walls 9 and 9' and will flow down into the cell 2' through the venting and electrolyte pouring hole 6' and, in response to it, the gas within the cell 2' will be smoothly exhausted into the electrolyte filled part 5 through the electrolyte level defining tube 8' as shown by the arrow without being obstructed by the poured electrolyte and will be further discharged out through the exhaust port 10 and exhaust pipe 11. When the electrolyte level in the cell 2' reaches the lower end of the electrolyte level defining tube 8', the electrolyte 23 will stop flowing down, will begin to stay in the space enclosed with the dividing walls 9 and 9', will finally overflow the dividing walls 9 and 9', will flow out into the adjacent electrolyte filled parts and will then flow down into the cells 2 and 2" respectively through the venting and electrolyte pouring holes 6 and 6". When the respective electrolyte levels reach the lower ends of the electrolyte level defining tubes 8 and 8", the electrolyte will stop flowing down and will continue to stay up to the heights of the dividing walls 9 and 9' of the electrolyte filled part 5. In the above mentioned explanation, it is said that, when the pouring of the electrolyte into the middle cell 2' is completed, the electrolyte 23 will overflow the dividing walls into the electrolyte filled parts of the adjacent cells 2 and 2". However, it is usual that the amount of the electrolyte poured into the electrolyte filled parts enclosed with the dividing walls 9 and 9' is larger than that of the electrolyte poured into the cell 2' through the venting and electrolyte pouring hole 6' of the cell 2'. In such case, before the pouring of the electrolyte into the cell 2' is completed, the poured electrolyte 23 will overflow the dividing walls 9 and 9' of the electrolyte filled part of the cell 2' into the electrolyte filled parts of the adjacent cells 2 and 2", the pouring of the electrolyte into the respective cells will be the same as in the case of the cell 2' as described above and the electrolyte 23 will begin to stay in the electrolyte filled part 5. As shown in FIG. 6, when the electrolyte 23 stays up to the heights of the dividing walls 9 and 9', the level of the entire electrolyte in the electrolyte filled part 5 will begin to rise all together. Therefore, the pouring of the electrolyte is stopped. When the storage battery itself is then lightly rocked to open the lower ends of the respective electrolyte level defining tubes 8, 8' and 8", the electrolyte 23 staying in the electrolyte filled part 5 will flow down into the cells 2, 2' and 2" respectively through the venting and electrolyte pouring holes 6, 6' and 6" as in FIG. 7. Lastly, when the electrolyte port plug 14 is returned to the original position to close the electrolyte pouring port 12, the electrolyte pouring operation will end.

The feature of the present invention relates to the internal stucture of a battery container cover. The electrolyte filled part 5 common to the respective cells and provided with the venting and electrolyte pouring holes 6, 6' and 6" and electrolyte level defining tubes 8, 8' and 8" for the respective cells 2, 2' and 2" is provided also with dividing walls 9 and 9' sectioning and dividing the electrolyte filled part into cell units. Therefore, when the electrolyte 23 is poured en masse into the electrolyte filled part 5, the electrolyte will be able to be quickly and positively poured into all the cells. When the heights of the dividing walls 9 and 9' are made lower than the upper ends of the electrolyte level defining tubes 8, 8' and 8" and are determined properly, the amount of the flow of the electrolyte staying in the electrolyte filled part 5 in the ending period of pouring the electrolyte will be determined. When the positions of the lower ends of the electrolyte level defining tubes 8, 8' and 8" are set by anticipating the amount of the flow, amounts of the electrolyte defined for all the cells will be able to be poured.

FIG. 8 shows another embodiment of the present invention in which cuts 24 and 24' are provided respectively in the dividing walls 9 and 9' and are preferably of the same height. When the electrolyte is poured into the respective cells, the exhaust from within the cells caused by pouring the electrolyte (air within the cells will be dispersed by the replacement with the electrolyte) will rise through the electrolyte level defining tubes and will smoothly collect in the exhaust port 10 due to the presence of these cuts 24 and 24'. In case there are no such cuts 24 and 24', the exhaust from the cell near to the exhaust port 10 will be fast but the exhaust from the cell far from the exhaust port 10 will be comparatively slow. Therefore, though the pouring of the electrolyte is not yet completed, the same as is completed, the electrolyte 23 may stay in the electrolyte filled part 5. However, when the electrolyte is poured comparatively quickly, it will thus stay. If there is a proper clearance above the dividing wall as usual and the electrolyte is poured slowly, there will be no problem.

By the way, if the height of the above mentioned cuts 24 and 24' is represented by a, the widths of them are represented by b and b' and the cross-sectional area (a×b) of the cut 24 of the dividing wall 9 far from the exhaust port 10 is made larger than the cross-sectional area (a×b') of the cut 24' of the dividing wall 9' near to the exhaust port, the exhaust of air will be faster and the pouring of the electrolyte will be able to be completed in a considerably short time. This is effective particularly to the structure of a storage battery for such small type as, for example, a motorcycle wherein no sufficient clearance can be provided above the dividing wall.

Further, during the use of the storage battery, even if the electrolyte 23 is made to flow back to the electrolyte filled part 5 by the vibration, due to the presence of the dividing walls 9 and 9', it will not flow out and will return to the original cells, the amounts of the electrolyte in the respective cells will never be likely to be unbalanced and, as a result, the electrolyte 23 will be prevented from flowing back to be of a large amount on one side and leaking out through the exhaust port 10.

On the other hand, the gas generated during the use of the storage battery will accumulate in the electrolyte filled part 5 from the respective cells 2, 2' and 2" through this structure and will be safely exhausted out through the exhaust port 10 and exhaust pipe 11.

The present invention having the above advantages is adapted to storage batteries for automobiles and motorcycles and is most adapted to maintenance-free type storage batteries among them. By the way, in the above mentioned embodiments, a storage battery of 6 volts has been illustrated and explained. However, it is needless to say that the present invention is not limited to it and can be variously modified within the scope not deviating from the spirit and claims of the present invention.

While the present invention has been described with reference to particular embodiments thereof, it will be understood that numerous modifications may be made by those skilled in the art without actually departing from the spirit and scope of the invention as defined in the appended claims.

What is claimed is:

1. A storage battery comprising an electrolyte filled part common to respective cells and provided in a cover covering the battery container, and including venting and electrolyte pouring holes provided in the bottom thereof for the respective cells, electrolyte level defining tubes projecting upwardly from said bottom within said electrolyte filled part and downwardly substantially to define a defined electrolyte level for the respective cells, dividing walls dividing said electrolyte filled part into cell units and including a portion lower than the upper ends of said electrolyte level defining tubes, an exhaust port provided at one end of said electrolyte filled part and common to the respective cells, an electrolyte pouring port provided in the upper part of said electrolyte filled part and common to the respective cells, and an electrolyte port plug closing said electrolyte pouring port.

2. The storage battery according to claim 1 wherein said cover is hinged and said electrolyte port plug is formed integrally with the cover, and connected rotatably with a hinge part at one end of the side part of the cover and made to open and close the electrolyte filled part.

3. The storage battery according to claim 1 provided with a battery container and cover made of a polyolefine type synthetic resin.

4. The storage battery according to claim 1 wherein said dividing walls are provided with respective cutaway portions lower than the upper ends of said electrolyte level defining tubes.

5. The storage battery according to claim 4 wherein the cross-sectional area of the cutaway portions most removed from the exhaust port are made larger than that of the cutaway portions nearer to the exhaust port.

6. The storage battery according to claim 1 further comprising an exhaust pipe connected to said exhaust port.

* * * * *